UNITED STATES PATENT OFFICE.

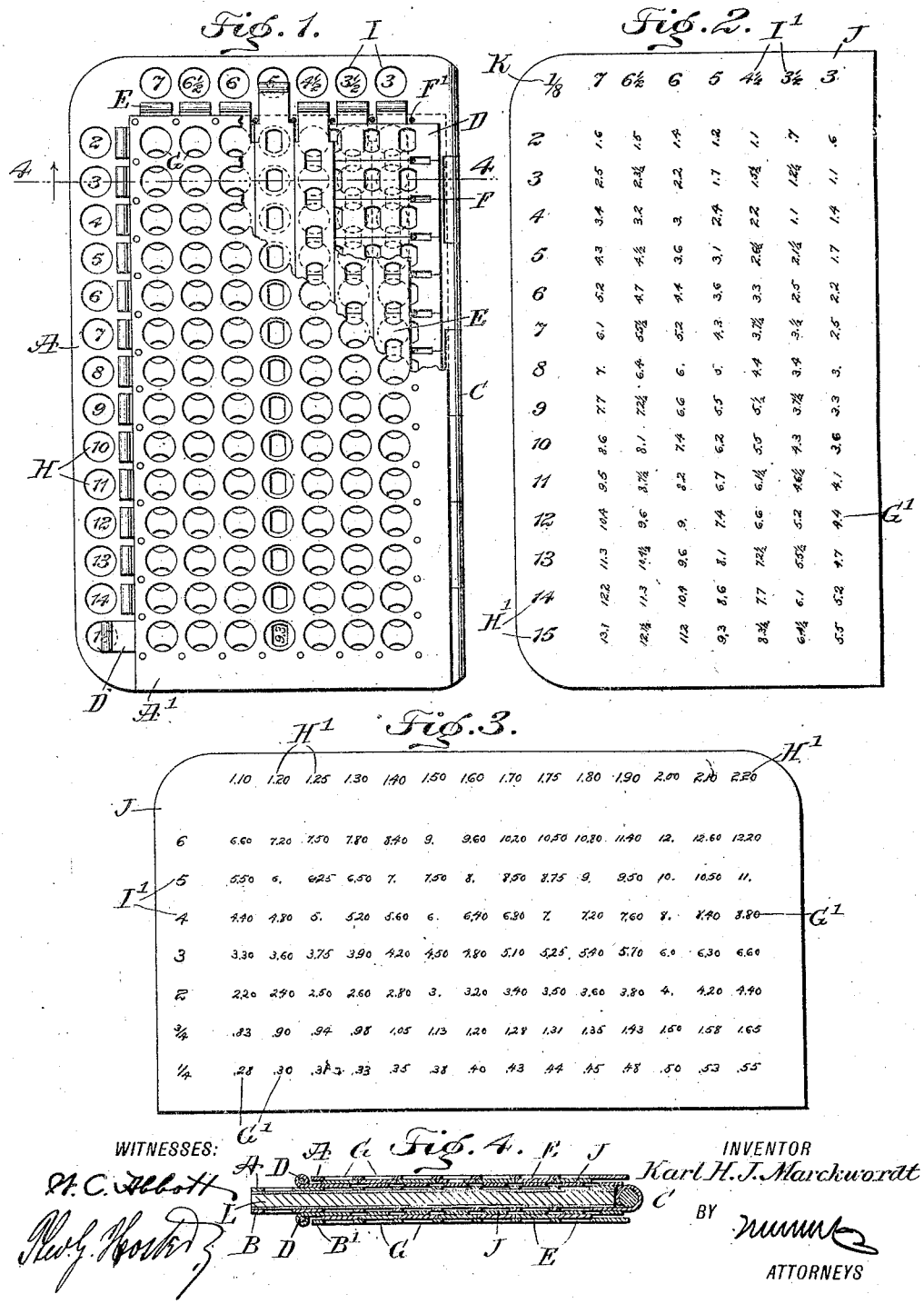

KARL HEINRICH JOHANN MARCKWORDT, OF GUATEMALA, GUATEMALA.

CALCULATOR.

No. 820,226.      Specification of Letters Patent.      Patented May 8, 1906.

Application filed October 9, 1905. Serial No. 282,072.

*To all whom it may concern:*

Be it known that I, KARL HEINRICH JOHANN MARCKWORDT, a subject of the German Emperor, and a resident of Guatemala, Guatemala, have invented a new and Improved Calculator, of which the following is a full, clear, and exact description.

The invention relates to registers; and its object is to provide a new and improved calculator more specially designed for conveniently and accurately carrying out arithmetical calculations, such as calculating wages, volumes, multiplication, degrees of alcohol, lumber measures, degrees of sugar polarization, and the like.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a plan view of the improvement, parts being broken away. Fig. 2 is a face view of a table for calculating wages in pesos and reales. Fig. 3 is a like view of a table for calculating wages in dollars and cents, and Fig. 4 is a transverse section of the improvement on the line 4 4 of Fig. 1.

The improved calculator, as illustrated in Figs. 1 and 4, is preferably made in the form of two metallic plates A and B, connected with each other by a hinge C to allow of swinging the plates A and B into an open position for the convenient insertion of tables, as hereinafter more fully described. The plates A and B are provided on their outer faces with face-plates A' and B', and between the face-plates A' and B' and their plates A and B are mounted to slide sets of transverse slides D and sets of longitudinal slides E, the slides being apertured, and the outward sliding movement of the slides D and E is limited by suitable stops F and F'. (See Fig. 1.) The plates A and B and their face-plates A' and B' are provided with calculating-apertures G, arranged in transverse and longitudinal rows, so that when the slides D and E are drawn into an outermost position their apertures register with the corresponding calculating-apertures G. Each of the plates A and B is also provided with rows of factor-apertures H and I, located near the margins of the plates, as plainly indicated in the drawings.

In connection with the apparatus use is made of calculating-tables J, such as shown in Figs. 2 and 3, each table containing marginal rows of numerals H' and I', registering with the apertures H and I whenever a table J is placed on the inner face of the corresponding plate A or B. Each of the tables J is also provided with the calculations G', indicating the product of the factors contained in the rows of numerals H' and I', and the calculations G' are adapted to register with the apertures G and those in the slides D and E whenever the latter are drawn out. For instance, as shown in Fig. 2, the factors H' indicate the wage per day in reales and the factors I' indicate the working days, while the calculations G' indicate the amount of the wages for the corresponding number of days and the wage per day. Now when this table J is placed in position on the rear face of the plates A or B and the several slides D and E are in an innermost position and it is desired to find the wage for five days at fifteen reales a day, then the operator draws the slide registering with the numeral "5," appearing through the opening I, and also draws the slide D opposite the numeral "15," appearing through the corresponding aperture H. (See Fig. 1.) Now when the slides are drawn as described the numeral "9.3" appears, indicating that the wage is nine pesos and three reales, it being understood that a peso is eight reales, and consequently fifteen multiplied by five equals seventy-five and seventy-five divided by eight equals 9.3.

In order to avoid misunderstandings, the table J (shown in Fig. 2) is provided with the numeral K representing one-eighth, thus indicating that the table is to be used when calculating the wages in pesos and reales. In a like manner if the table J is used, as shown in Fig. 3, and proceeding in the manner above described, the wages in dollars and cents can be readily found on drawing the corresponding slides D and E after the table is placed in position on the rear face of the plate A or B.

In order to conveniently hold the table J in position against the inner face of the corresponding plate A or B, a partition L is used, placed between the two tables, so as to press the same in contact with the corresponding plates A and B when the latter are in a closed position, as plainly indicated in Fig. 4.

Although I have given but samples of tables for calculating wages, it is evident that similar tables may be constructed for carrying on other calculations than the ones mentioned.

Having thus described my invention, I claim as new and desire to secure by Letters Patent—

1. A calculating device comprising a plate having calculation-apertures arranged in transverse and longitudinal rows, for disclosing the calculation, the plate also having marginal rows of factor-apertures for disclosing factors, a second plate having apertures corresponding to the calculation-apertures on the first plate and secured thereto, sets of transverse and longitudinal slides for opening and closing the said apertures and arranged between the plates, the slides having apertures adapted to register with the calculation-apertures, and a table adapted to be placed on the rear face of the plate and having marginal factors appearing through the factor-openings and calculations registering with the calculation-apertures.

2. A calculating device comprising a pair of plates hinged together and each having calculation-apertures arranged in transverse and longitudinal rows for disclosing the calculation, each plate also having marginal rows of factor-apertures for disclosing factors, a second plate having apertures corresponding to the calculation-apertures of the first plate and secured thereto, sets of apertured transverse and longitudinal slides mounted to slide between the plates, the slide-openings being adapted to register with the factor-apertures when drawn into an outermost position, means for limiting the outward motion of the slides, and tables placed on the rear faces of the first-named plate, each table having marginal factors appearing through the factor-openings and calculations registering with the calculation-apertures.

3. A calculating device comprising a pair of plates hinged together and each having calculation-apertures arranged in transverse and longitudinal rows for disclosing the calculation, each plate also having marginal rows of factor-apertures for disclosing factors, sets of apertured transverse and longitudinal slides mounted to slide on the outer face of each plate, the slide-openings being adapted to register with the factor-apertures when drawn into an outermost position, tables placed on the rear faces of the said plates each table having marginal factors appearing through the factor-openings and calculations registering with the calculation-apertures, and a partition between the said tables for separating the same and holding the tables against the corresponding faces of the plates.

In testimony whereof I have signed my name to this specification in the presence of two subscribing witnesses.

KARL HEINRICH JOHANN MARCKWORDT.

Witnesses:
J. YRIGOYEN,
EMIL ZVEDIKE.